US010689095B2

(12) United States Patent
Zerweckh

(10) Patent No.: US 10,689,095 B2
(45) Date of Patent: Jun. 23, 2020

(54) FIBER SHEET STACKED ROTOR DESIGN

(71) Applicant: Wing Aviation LLC, Mountain View, CA (US)

(72) Inventor: Siegfried Zerweckh, Berkeley, CA (US)

(73) Assignee: Wing Aviation LLC, Mountain View, CA (US)

(*) Notice: Subject to any disclaimer, the term of this patent is extended or adjusted under 35 U.S.C. 154(b) by 79 days.

(21) Appl. No.: 15/847,515

(22) Filed: Dec. 19, 2017

(65) Prior Publication Data
US 2019/0185143 A1 Jun. 20, 2019

(51) Int. Cl.
B64F 5/10 (2017.01)
B64C 11/48 (2006.01)
B64C 11/22 (2006.01)
B64C 27/473 (2006.01)
B32B 1/00 (2006.01)
B64C 39/02 (2006.01)

(52) U.S. Cl.
CPC ............ B64C 11/48 (2013.01); B32B 1/00 (2013.01); B64C 11/22 (2013.01); B64C 27/473 (2013.01); B64F 5/10 (2017.01); B32B 2603/00 (2013.01); B64C 39/024 (2013.01); B64C 2201/021 (2013.01); B64C 2201/024 (2013.01); B64C 2201/027 (2013.01); B64C 2201/108 (2013.01); B64C 2201/165 (2013.01)

(58) Field of Classification Search
CPC .......... B64C 11/48; B64C 5/10; B64C 11/22; B64C 27/473; B64C 2201/024; B64C 2201/108; B32B 2603/00; B32B 1/00
See application file for complete search history.

(56) References Cited

U.S. PATENT DOCUMENTS 1,021,822 A * 4/1912 Broussouse .............. B63H 1/14
416/200 R
1,158,559 A 11/1915 Rozewski
(Continued)

FOREIGN PATENT DOCUMENTS

WO 2017/106546 6/2017

OTHER PUBLICATIONS

International Searching Authority, International Search Report and Written Opinion dated Apr. 25, 2019, issued in connection with International Patent Application No. PCT/US20181064220, filed on Dec. 6, 2018, 13 pages.

Primary Examiner — Moshe Wilensky
Assistant Examiner — Theodore C Ribadeneyra
(74) Attorney, Agent, or Firm — McDonnell Boehnen Hulbert & Berghoff LLP

(57) ABSTRACT

A rotor unit is disclosed. The rotor unit includes a hub and a stacked rotor blade. The hub is configured to rotate about an axis in a first rotation direction. The stacked rotor blade is rotatable about the axis and further includes a first blade element and a second blade element. The first blade element has a first leading edge and the second blade element has a second leading edge. The blade elements are arranged in a stacked configuration. A leading edge of the stacked rotor blade is formed by at least a portion of the first leading edge of the first blade element as well as at least as portion of the second leading edge of the second blade element. In some embodiments, the rotor unit is coupled to an unmanned aerial vehicle.

20 Claims, 11 Drawing Sheets

(56) References Cited

U.S. PATENT DOCUMENTS

| | | | | |
|---|---|---|---|---|
| 1,775,568 A * | 9/1930 | Piesik | B64C 11/16 | |
| | | | 416/228 | |
| 1,779,026 A * | 10/1930 | Wragg | B64C 11/18 | |
| | | | 416/196 R | |
| 1,864,492 A * | 6/1932 | Krasnodmsky | B64C 11/48 | |
| | | | 416/200 R | |
| 1,874,545 A * | 8/1932 | Koch | B63H 5/10 | |
| | | | 416/200 R | |
| 1,881,080 A * | 10/1932 | Hubert | B64C 11/48 | |
| | | | 416/129 | |
| 2,265,734 A * | 12/1941 | Kloepfer | B64C 11/48 | |
| | | | 416/198 R | |
| 2,340,133 A | 1/1944 | Martin | | |
| 2,437,399 A * | 3/1948 | Morgan | B64C 11/48 | |
| | | | 416/198 R | |
| 3,606,579 A * | 9/1971 | Mehus | B63H 1/18 | |
| | | | 416/200 R | |
| 3,784,322 A | 1/1974 | Erich et al. | | |
| 4,627,791 A | 12/1986 | Marshall | | |
| 4,687,416 A | 8/1987 | Spranger | | |
| 4,840,540 A * | 6/1989 | Kallergis | B64C 11/16 | |
| | | | 415/119 | |
| 4,913,670 A * | 4/1990 | Spranger | B63B 3/38 | |
| | | | 416/231 B | |
| 4,971,641 A | 11/1990 | Nelson et al. | | |
| 8,535,008 B2 * | 9/2013 | Dewar | F03B 3/12 | |
| | | | 416/170 R | |
| 10,117,380 B1 * | 11/2018 | Kaukler | A01D 34/826 | |
| 2009/0074578 A1 * | 3/2009 | Dewar | F03B 3/12 | |
| | | | 416/147 | |
| 2009/0220347 A1 | 9/2009 | Ball et al. | | |
| 2009/0220747 A1 | 9/2009 | Karem | | |
| 2010/0254812 A1 * | 10/2010 | Reitz | F03D 1/025 | |
| | | | 416/1 | |
| 2012/0156042 A1 | 6/2012 | Li | | |
| 2012/0280857 A1 * | 11/2012 | Elder | B64C 27/46 | |
| | | | 342/26 B | |
| 2015/0225080 A1 * | 8/2015 | Bormann | B64C 31/06 | |
| | | | 244/155 A | |
| 2017/0114789 A1 * | 4/2017 | Niemiec | F04D 25/088 | |
| 2017/0137114 A1 | 5/2017 | Henze et al. | | |
| 2017/0274978 A1 | 9/2017 | Beckman et al. | | |
| 2017/0274982 A1 * | 9/2017 | Beckman | B64C 11/48 | |
| 2018/0340508 A1 * | 11/2018 | Watanabe | F03B 3/145 | |

\* cited by examiner

FIBER SHEET STACKED ROTOR DESIGN

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Embodiments described herein relate to unmanned aerial vehicles (UAV) rotor units having stacked rotor blades. The stacked rotor blades are formed from blade elements that are arranged in a stacked configuration. The blade elements can be easily manufactured from simple machining processes, such as laser cutting the blade elements from a fiber sheet material. Furthermore, arranging the blade elements in a stacked configuration allows for a high degree of control over the overall design and function of the assembled stacked rotor blades. Moreover, the stacked rotor blades disclosed herein may also reduce the noise of UAV rotors during flight while maintaining or possibly increasing efficiency as compared to existing rotor blade designs.

In a first aspect, a rotor unit is provided. The rotor unit includes a hub and a stacked rotor blade. The hub is configured to rotate about an axis in a first rotation direction. The stacked rotor blade is rotatable about the axis and further includes a first blade element and a second blade element. The first blade element has a first leading edge and the second blade element has a second leading edge. Moreover, the first blade element and the second blade element are arranged in a stacked configuration. Within examples, the stacked configuration may result in the first blade element and the second blade element being fixed to one another with a specific alignment. Additionally, a leading edge of the stacked rotor blade is formed from at least a portion of the first leading edge and at least a portion of the second leading edge. In some embodiments, the rotor unit is coupled to a UAV.

In a second aspect, a stacked rotor blade is provided. The stacked rotor blade includes a first planar blade element and a second planar blade element. The first blade element includes a first leading edge and a bottom planar surface while the second blade element includes a second leading edge and a top planar surface. The bottom planar surface of the first blade element is fixed to the top planar surface of the second blade element in a stacked configuration. The stacked rotor blade is configured to rotate in a first rotation direction. Moreover, at least a portion of the first leading edge of the first blade element leads at least a portion of the second leading edge of the second blade element in the first rotational direction. Additionally, at least a portion of the first leading edge and at least a portion of the second leading edge form a leading edge of the stacked rotor blade.

In yet another aspect, a method of manufacturing stacked blade rotor units is provided. The method includes cutting a plurality of blade elements. The blade elements may be laser cut from a fiber sheet, among other possibilities. At least one dimension of each of the blade elements is different than a corresponding dimension in each other blade element. Moreover, a leading edge of the stacked blade includes at least a portion of a leading edge from each of the cut blade elements. The method further includes coupling the blade elements to a hub.

In further aspects, any type of device or system could be used or configured as a means for performing functions of any of the methods described herein (or any portions of the methods described herein). For example, a system to manufacture stacked rotor blade units includes means to cut a plurality of blade elements. The system further includes means to align the blade elements as well as means to couple the blade elements to a hub of a rotor unit.

These as well as other aspects, advantages, and alternatives will become apparent to those of ordinary skill in the art by reading the following detailed description, with reference where appropriate to the accompanying drawings. Further, it should be understood that the description provided in this summary section and elsewhere in this document is intended to illustrate the claimed subject matter by way of example and not by way of limitation

DETAILED DESCRIPTION

Figure 1A:
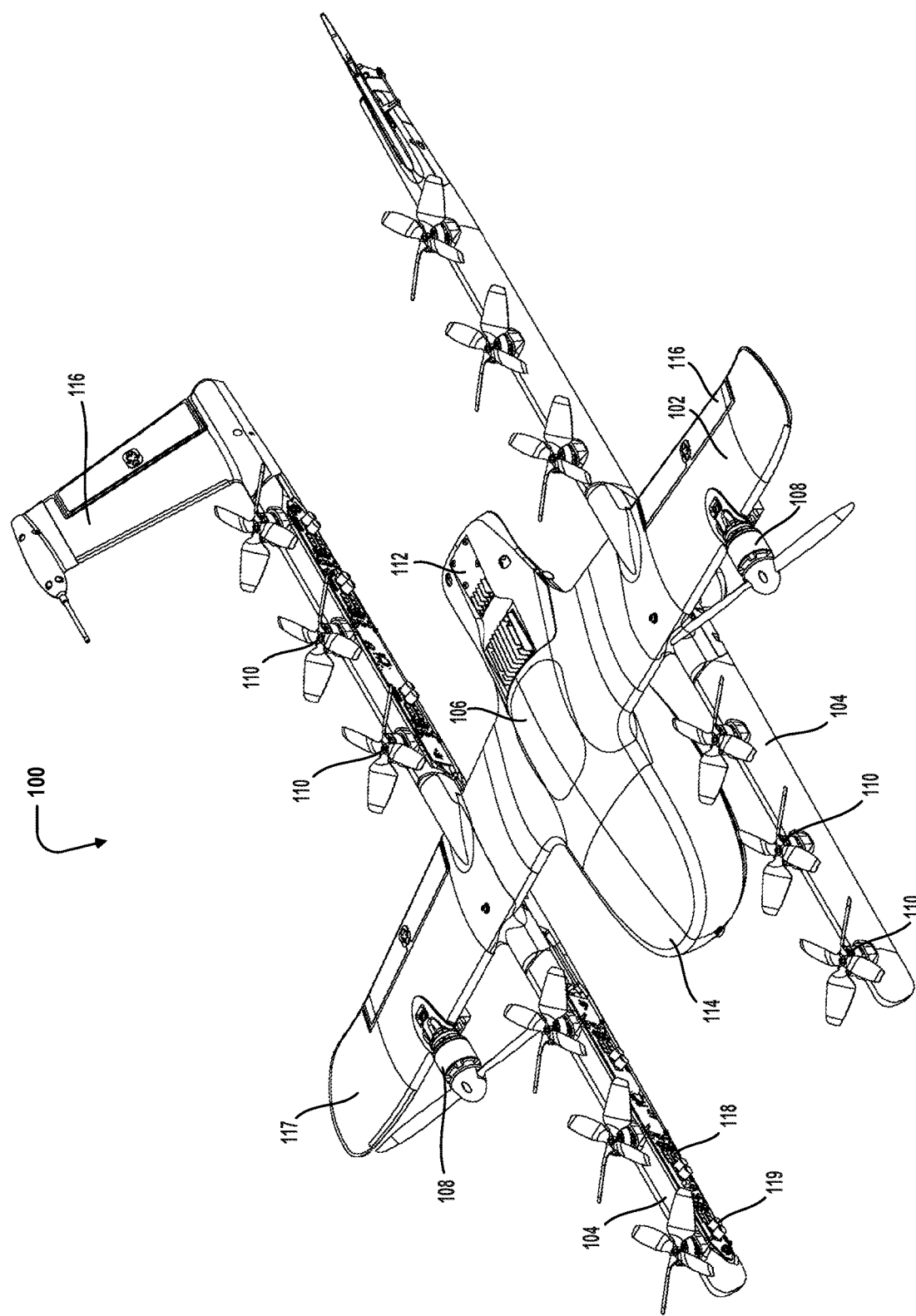
FIG. 1A is a simplified illustration of an unmanned aerial vehicle (UAV), according to an example embodiment.

Example methods, systems, and devices are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Exemplary embodiments may be implemented in or take of the form of an aerial vehicle; for example, an unmanned aerial vehicle (UAV). In example embodiments, a UAV may include "propulsion units" or "rotor units" operable to provide thrust or lift for the UAV for transport and delivery of a payload.

Low Reynolds number fluid dynamic conditions for small blades, such as used in UAV flight described herein, do not penalize minor steps or non-smooth rotor blade design. Thus, creating multiple blade elements from fiber sheets or other similar materials and then stacking those blade elements in a stacked configuration to form a stacked rotor blade allows for a wide-variety of rotor blade designs at lower manufacturing costs. Such designs reduce the need for expensive tooling set-ups that result in expensive scaling operations. Instead, stacked fiber sheet rotor blades allow for the shaping of each blade element to create the aero-equivalent of a solid propeller cross-section. An effective profile of a cross section of a stacked rotor blade may be the same or similar to a profile of a conventional airfoil, in some examples. However, individual blade elements are easier and simpler to produce at scale with existing manufacturing means, and those blade elements can then be combined to create necessary rotor designs. Moreover, the stacked rotor blades allow for easy customization of designs to create rotors for specific tasks as well as compiling various designs to reduce or minimize noise from UAVs utilizing stacked rotor blade designs. Additionally, some example stacked rotor blade designs disclosed herein may reduce an amount of noise generated by a UAV rotor in flight. For example, blade elements may include piezo sheets that may allow for further acoustic control such as increased harmonic control of the rotor.

The Figures described in detail below are for illustrative purposes only and may not reflect all components or connections. Further, as illustrations the Figures may not reflect actual operating conditions, but are merely to illustrate embodiments described. Further still, the relative dimensions and angles in the Figures may not be to scale, but are merely to illustrate the embodiments described.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
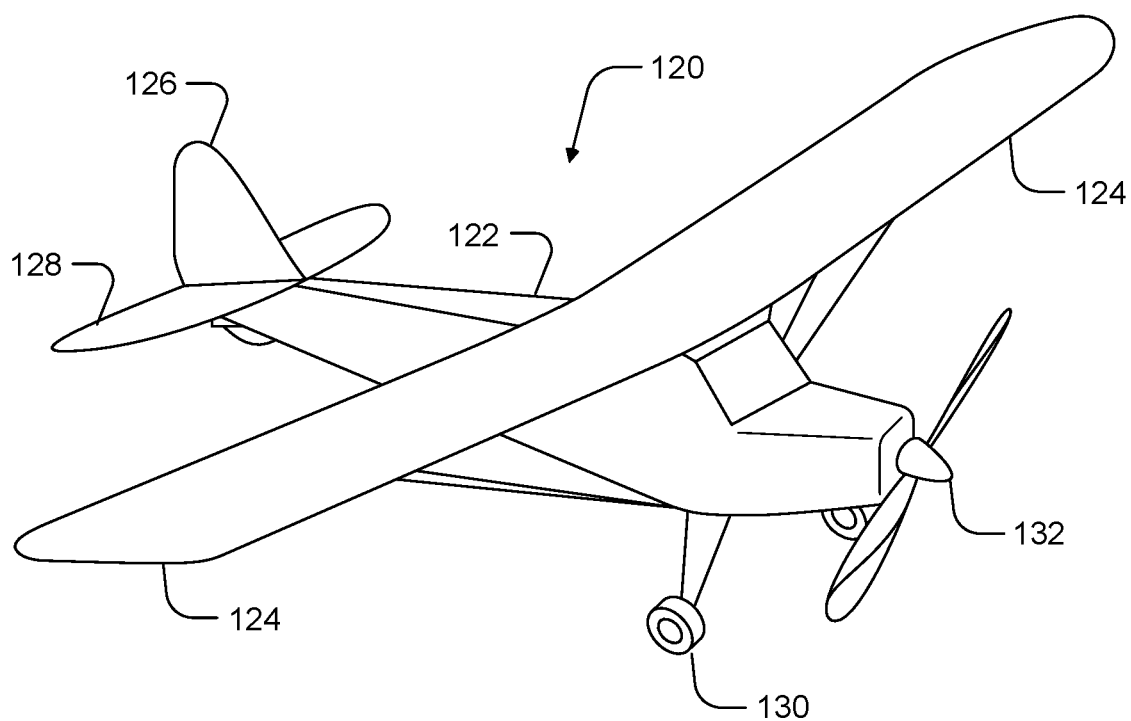
FIG. 1B is a simplified illustration of a UAV, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
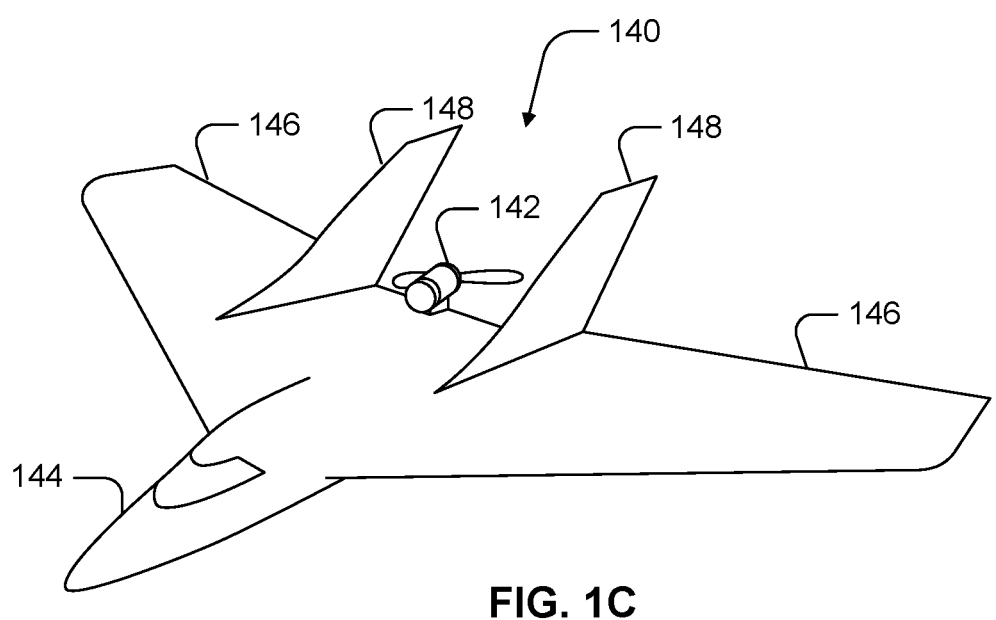
FIG. 1C is a simplified illustration of a UAV, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
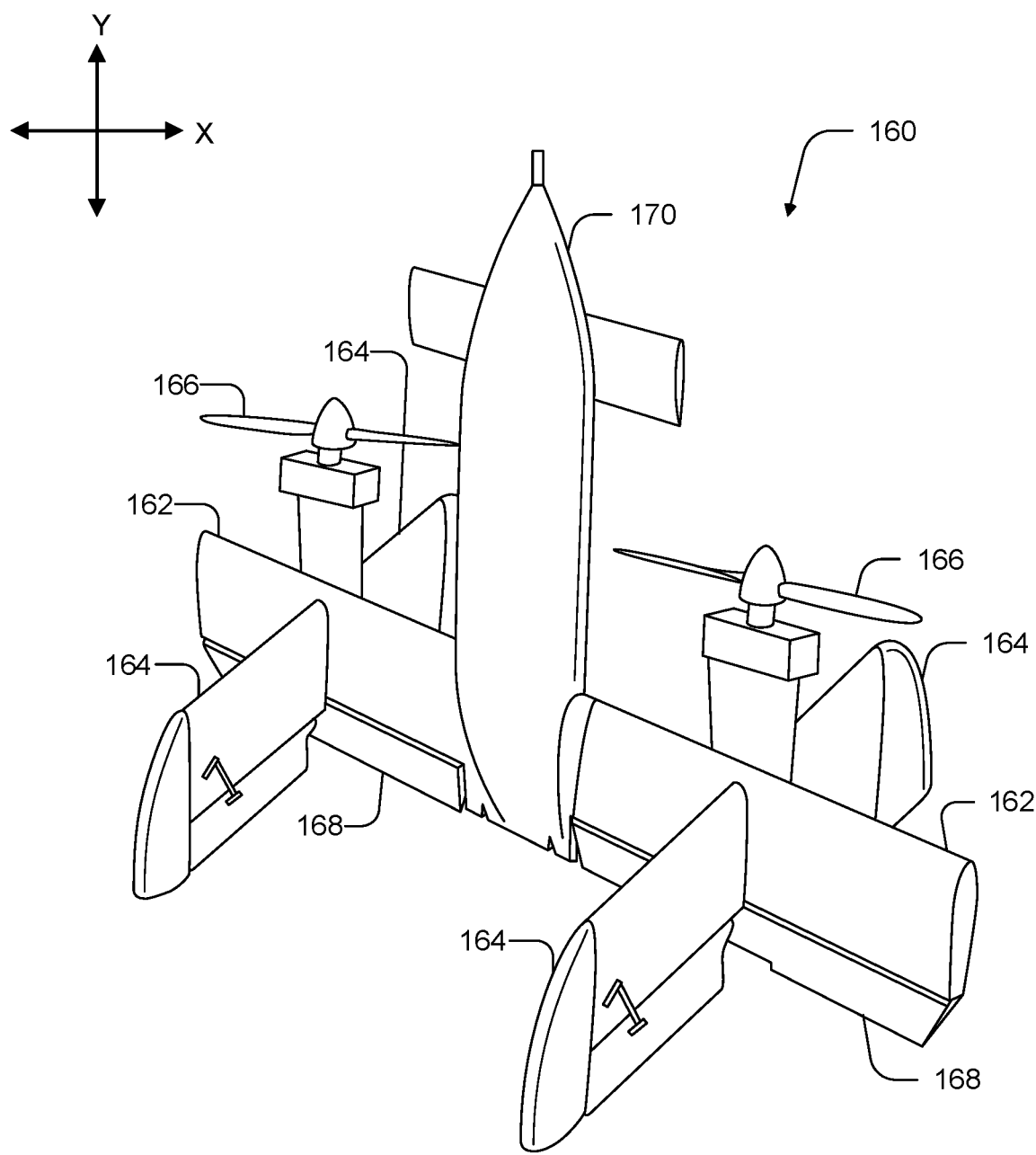
FIG. 1D is a simplified illustration of a UAV, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
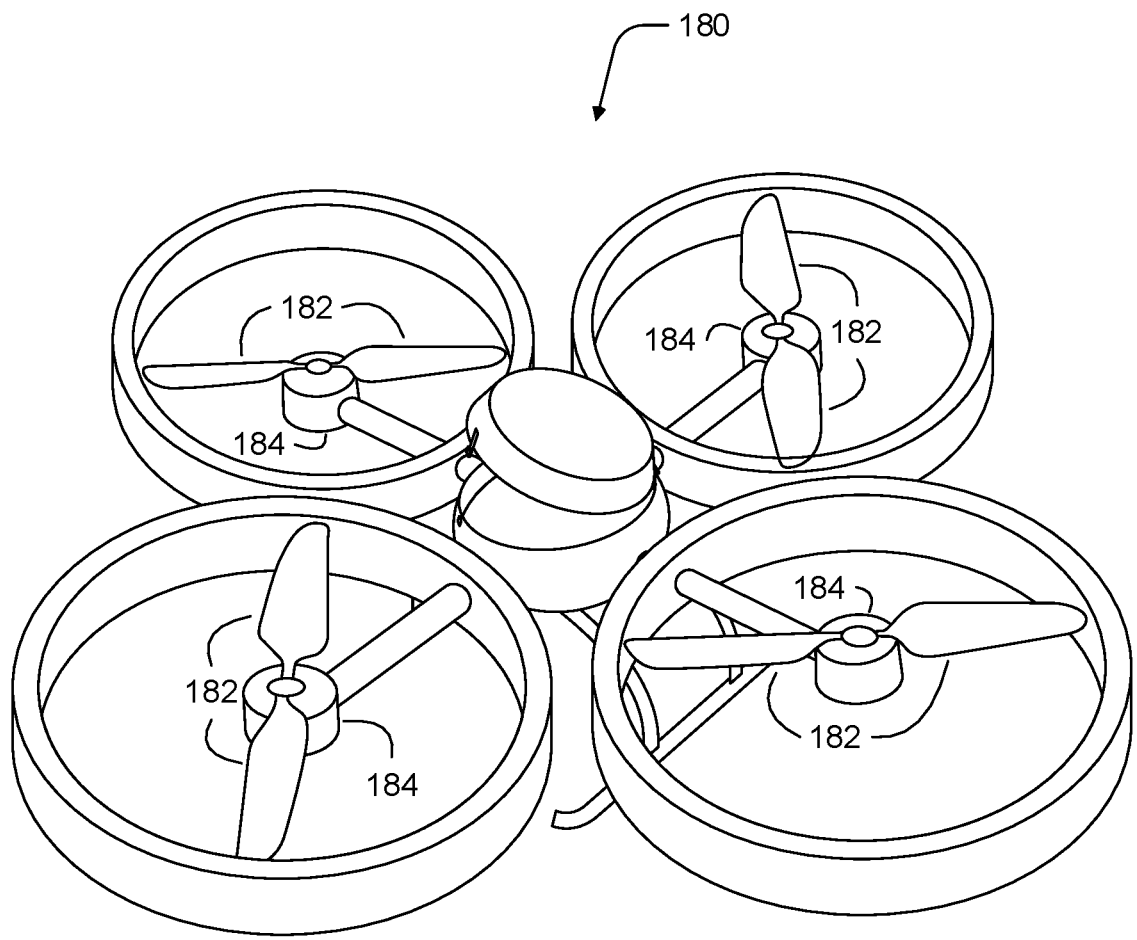
FIG. 1E is a simplified illustration of a UAV, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
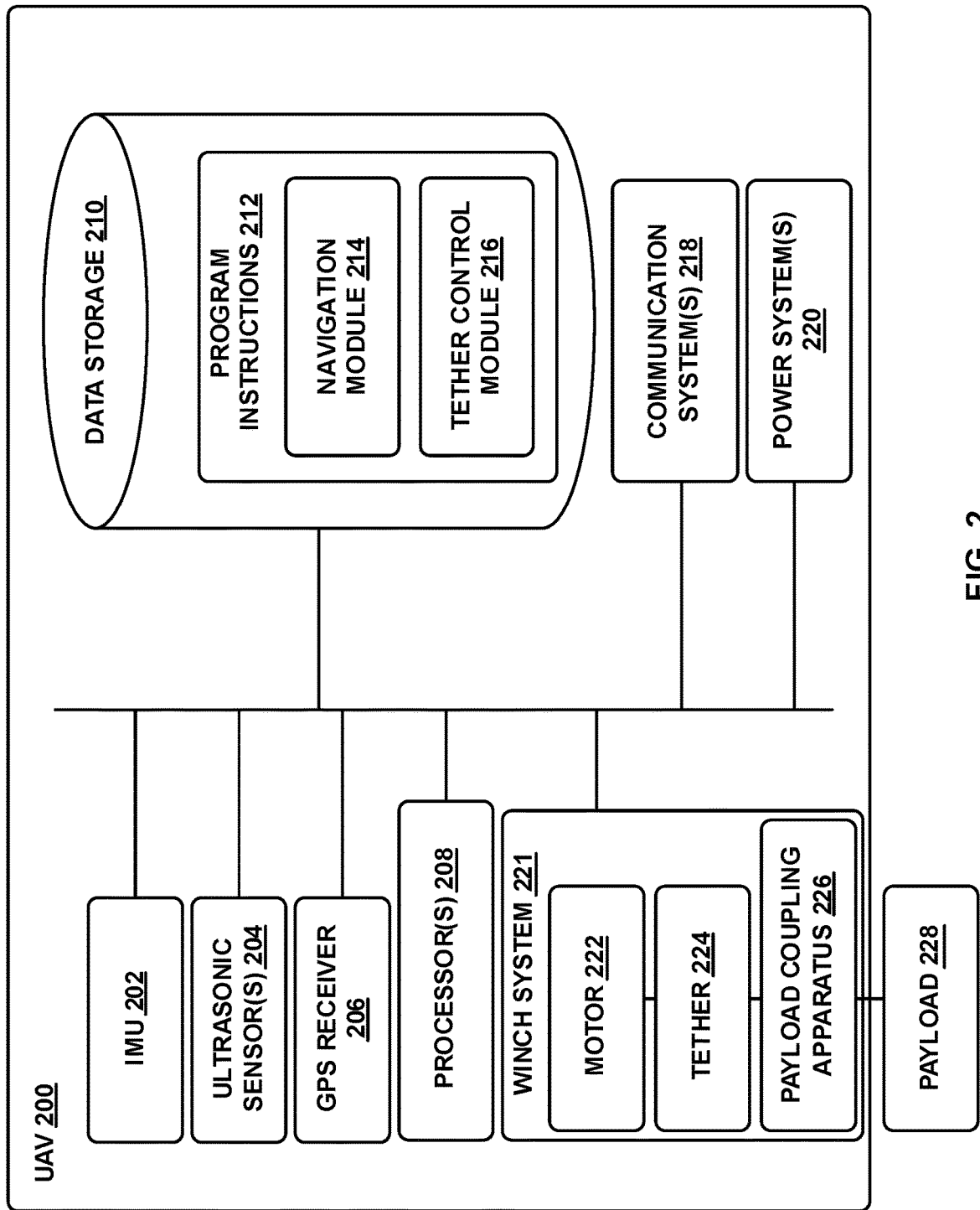
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 1100a, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In some embodiments, the control system 1120 may take the form of program instructions 212 and the one or more processors 208.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, Wi-Fi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a Wi-Fi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
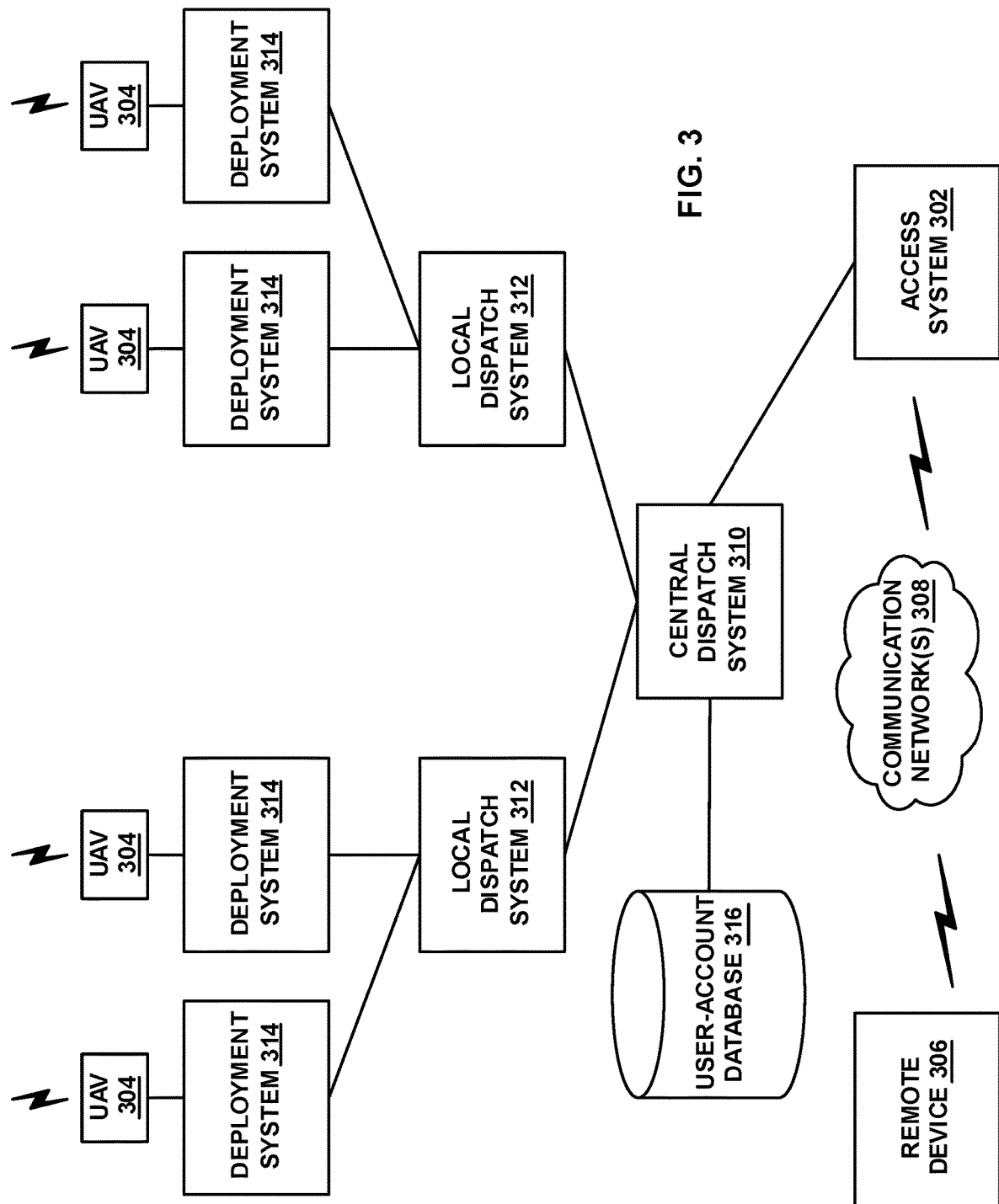
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

IV. Illustrative Rotor Units

Figure 4:
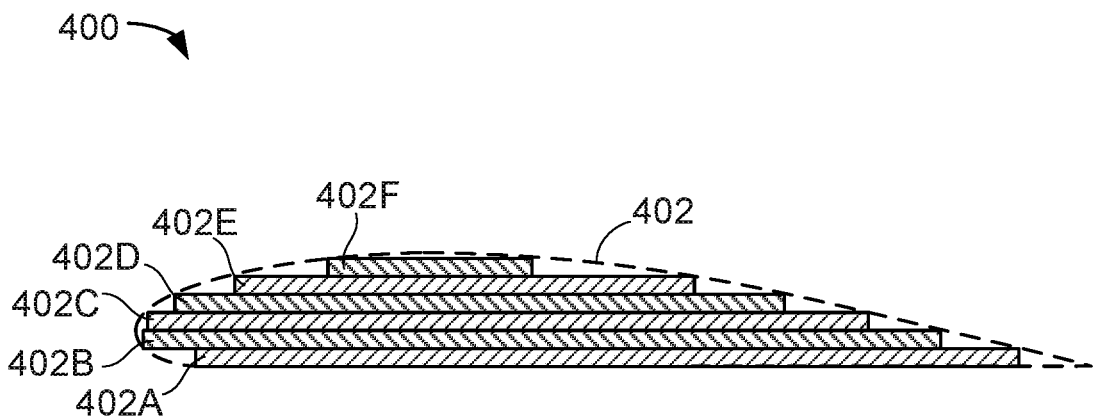
FIG. 4 depicts a cross section of a stacked rotor blade, according to an example embodiment.

FIG. 4 depicts a cross section of a stacked rotor blade 400, according to an example embodiment. The stacked rotor blade 400 is shaped like an airfoil such that as the stacked rotor blade 400 moves through air (or other mediums in other examples), a difference in pressure and relative velocity caused in part by a cross section profile 402 of the stacked rotor blade 400 produces aerodynamic forces, including a lift force, on the stacked rotor blade 400. In other words, as air flows over the stacked rotor blade 400, the flow may generally follow the profile 402 of the stacked rotor blade 400.

The stacked rotor blade 400 includes a plurality of blade elements 402A-402F (i.e., a first blade element 402A, a second blade element 402B, a third blade element 402C, a fourth blade element 402D, a fifth blade element 402E, and a sixth blade element 402F). Although six blade elements are illustrated in FIG. 4, the stacked rotor blade 400 may include more or less than six blade elements in various embodiments.

Although most airfoil designs avoid stepped or sharp edges, low Reynolds number fluid dynamic conditions for small blades, such as used in UAVs described herein, do not penalize minor steps or non-smooth rotor blades. As such, stacking individual blades, such as blade elements 402A-402F allow for relatively low cost and efficient production of rotor blades without the need for advanced tooling, shaping, and curving of a rotor blade. Instead, as illustrated in FIG. 4, multiple planar blade elements (e.g. blade elements 402A-402F) may be stacked on top of one another in order to create and an airfoil profile, such as the profile 402.

In some aspects, characteristics of each blade element (e.g., a leading edge, a trailing edge, a chord length, a span length, a camber, an angle of attack, a pitch, etc.) may form or be a portion of a related characteristic of the stacked rotor blade 400. For example, each of the blade elements 402A-402F may include a leading edge. In one example, a leading edge of the stacked rotor blade 400 may include at least a portion of a first leading edge of the first blade element 402A and at least a portion of a second leading edge of the second blade element 402B. Similarly, within examples, at a first radial distance from an axis of rotation, a chord of the stacked rotor blade 400 may be greater than a chord of each of the individual blade elements 402A-402F. In other examples, a span of the stacked rotor blade 400 may be greater than a span of each of the individual blade elements 402A-402F.

Moreover, in other aspects, material characteristics of each blade element may contribute to the design and functionality of the stacked rotor blade 400 as a whole. For example, blade elements 402A-402B and blade elements 402E-402F may be constructed from a very light material to keep a mass and/or weight of the stacked rotor blade 400 low. However, blade elements 402C-402D may be constructed from a more dense or heavier material that provides additional stiffness and sturdiness to the stacked rotor blade 400. In other examples, materials of the various blade elements 402A-402F may each, or in combination, vary in elasticity, yield strength, ductility, toughness, etc. In some examples, the plurality of blade elements 402A-402F may be constructed from fiber sheets, from plastic, from a composite material, from metal, from wood, among other materials. In some examples, the blade elements 402A-402F may include or be at least partly constructed from piezo sheets that may allow for further acoustic control by providing feedback from the stacked rotor blade 400 to a control system.

In some embodiments, a gap in an axial direction may exist between the blade elements 402A-402F. The axial direction is a direction parallel to an axis of rotation of the stacked rotor blade 400. However, in other embodiments, the blade elements 402A-402F may be fixed together via alignment features or a bonding material such as glue or another adhesive.

Within examples, the first blade element 402A, the second blade element 402B, the third blade element 402C, the fourth blade element 402D, the fifth blade element 402E, and the sixth blade element 402F are arranged in a stacked configuration. As illustrated in FIG. 4, the stacked configuration of the stacked rotor blade 400 defines the profile 402 of the stacked rotor blade 400. The stacked configuration, or alignment of the blade elements 402A-402F relative to one another, may be based on desired flight characteristics or a preferred airfoil cross section profile, such as profile 402. For example, the profile 402 may be described as a low camber, thick wing design. Within such an example, each of the blade elements 402A-402F may be planar or relatively flat. As such, each of the blade elements 402A-402F may include a top planar surface and a bottom planar surface. Within examples, at least a portion of the bottom planar surface of the second blade element 402B may be fixed to at least a portion of the top planar surface of the first blade element 402A. Moreover, each of the blade elements 402A-402F may be arranged in the stacked configuration such that the blade elements 402A-402F are directly on top of one another. Among other examples, the low camber, thick wing design of FIG. 4 may result in the profile 402 having a generally flat bottom with a low camber.

In other arrangements, the blade elements 402A-402F may be stacked such that at least a portion of at least one of a top surface or a bottom surface of each of the blade elements 402A-402F is fixed to at least a portion of a corresponding top or bottom surface of an adjacent blade element. For example, as depicted in FIG. 4, a portion the first blade element 402A is fixed to a portion of the adjacent second blade element 402B. In other aspects, the blade elements 402A-402F may be stacked such that at least a portion of each of the blade elements 402A-402F overlaps at least a portion of an adjacent blade element. For example, a portion of the third blade element 402C may overlap a portion of the second blade element 402B.

Figure 5:
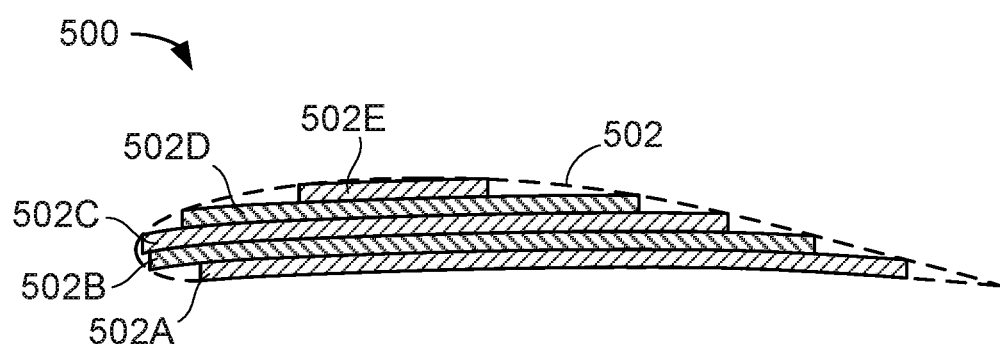
FIG. 5 depicts a cross section of a stacked rotor blade, according to an example embodiment.

FIG. 5 depicts a cross section of a stacked rotor blade 500, according to an example embodiment. The stacked rotor blade 500 may be similar to the stacked rotor blade 400 of FIG. 4, however a profile 502 of the stacked rotor blade 500 may be different than the profile 402 of the stacked rotor blade 400. Within examples, the stacked rotor blade 500 may include a plurality of blade elements 502A-502E. Unlike FIG. 4, each of the blade elements 502A-502E may be non-planar, and each may have a curved shape, among other examples. In some embodiments, the blade elements 502A-502E may be camber elements that each have a camber that may form a camber of the stacked rotor blade 500. As such, the profile 502 may be based on an arrangement of a stacked configuration of the blade elements 502A-502E. Moreover, the profile 502 may be based on aspects of the blade elements 502A-502E that may form or make up a part of a related aspect of the stacked rotor blade 500.

Figure 6A:
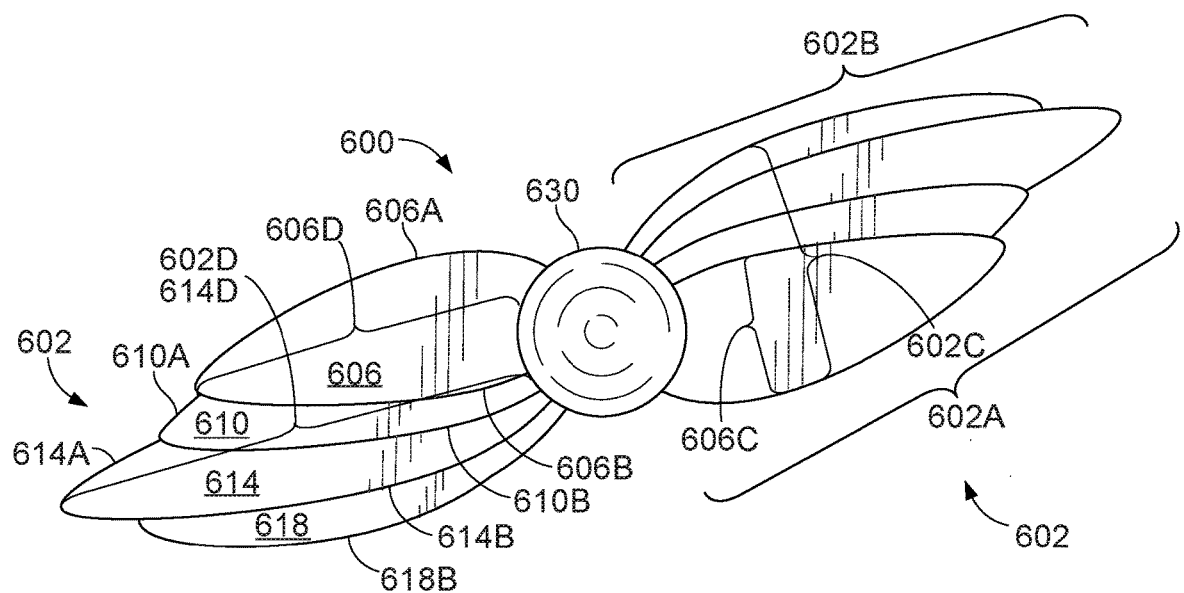
FIG. 6A depicts a top view of a stacked blade rotor unit, according to an example embodiment.
Figure 6B:
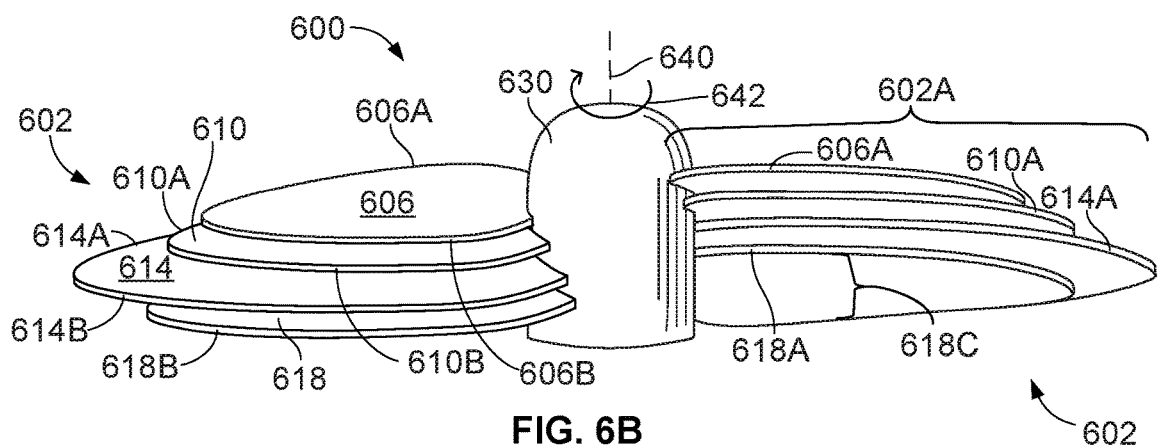
FIG. 6B depicts an elevation view of a stacked blade rotor unit, according to an example embodiment.

FIG. 6A and FIG. 6B depict a stacked blade rotor unit 600, according to an example embodiment. The rotor unit 600 may take the form of, or be similar in form to, the rotors described in FIGS. 1A-1E above. Moreover, components and aspects of the rotor unit 600 may take similar form and have similar function to components and aspects of the rotors described in FIGS. 1A-1E.

As shown in FIGS. 6A and 6B, the rotor unit 600 includes two stacked rotor blades 602. The stacked rotor blades 602 may have aspects similar to the stacked rotor blade 400 of FIG. 4 and/or the stacked rotor blade 500 of FIG. 5. While two stacked rotor blades 602 are depicted, other embodiments contemplated herein may include more than two stacked rotor blades. The rotor unit 600 further includes a hub 630 that is coupled to the stacked rotor blades 602. Within examples, the hub 630 may be coupled to a root portion of the stacked rotor blades 602. The hub 630 may include, or be coupled to, a motor that drives the rotation of the hub 630 and the stacked rotor blades 602 about an axis 640 in a first rotation direction 642. Each of the stacked rotor blades 602 include a plurality of blade elements, which includes, as depicted in FIGS. 6A and 6B, a first blade element 606, a second blade element 610, third blade element 614, and a fourth blade element 618. While the plurality of blade elements depicted in FIGS. 6A and 6B are depicted as having four blades (i.e., 606, 610, 614, and 618), more or less blades are also contemplated herein.

Each of the stacked rotor blades 602 includes a leading edge 602A and a trailing edge 602B. Moreover, each blade element of the plurality of blade elements also includes a leading edge and a trailing edge. For example, as depicted in FIGS. 6A and 6B, the first blade element 606 includes a leading edge 606A and a trailing edge 606B, the second blade element 610 includes a leading edge 610A and a trailing edge 610B, the third blade element 614 includes a leading edge 614A and a trailing edge 614B, and the fourth blade element 618 includes a leading edge 618A and a trailing edge 618B. Within examples, the leading edge 602A of the stacked rotor blades 602 may be formed from leading edges of the plurality of blade elements. For example, at least a portion of the leading edge 606A, the leading edge 610A, and the leading edge 614A may combine to form the leading edge 602A. In some examples, when the stacked rotor blades 602 rotate in the first rotation direction 642, at least a portion of the first leading edge 606A leads, or is in front of, the second leading edge 610A in the first rotation direction 642.

Additionally, the stacked rotor blades 602 may have a chord dimension 602C ("chord 602C") and a span dimension ("span 602D"). A chord dimension includes a length of a chord line which is a straight line connecting the extremities of a mean line of a rotor blade at a radial distance outward from the axis 640. In other words, the chord is a length from a leading edge to a trailing edge of a rotor blade (or blade element). In some examples, the chord may vary with the radial distance, while in other examples, the chord may be the same, or nearly the same, across the entire, or nearly the entire, span of a rotor blade. Similarly, a span dimension of a rotor blade is a straight line length from a tip (or farthest point of a rotor blade radially outward from an axis of rotation) to a root (or nearest point of a rotor blade radially from the axis of rotation) of a rotor blade.

Each blade element of the plurality of blade elements also includes a chord dimension and a span dimension. For example, the first blade element 606 includes a chord 606C and a span 606D. Although not every dimension is depicted, it should be understood that each of the other blade elements have similar dimensional aspects. For example, the second blade element 610 includes a chord 610C (not depicted) and a span 610D (not depicted), the third blade element 614 includes a chord 614C (not depicted) and a span 614D, and the fourth blade element 618 includes a chord 618C and a span 618D (not depicted).

Within examples, the plurality of blade elements may form the stacked rotor blades 602, and as such, dimensional aspects of the stacked rotor blades 602 may be based on similar aspects of the plurality of blade elements. For example, as illustrated in FIGS. 6A and 6B, the third blade element 614 may have the span 614D that is the same as the span 602D of the stacked rotor blades 602. In such an example, the third blade element 614 may also have a largest span (i.e., length from root to tip) of each of the plurality of blade elements. Continuing with this example, and as depicted in FIGS. 6A and 6B, the span 602D of the stacked rotor blades 602 is greater than the span 606D of the first blade element 606, the span 610D of the second blade element 610, and the span 618D of the fourth blade element 618. Moreover, different blade elements may have spans different from other blade elements. For example, the span 610D may be greater than the span 606D, among other examples.

In some aspects, the chord 602C of the stacked rotor blades 602 may include at least a portion of the chord 606C of the first blade element 606, the chord 610C of the second blade element 610, the chord 614C of the third blade element 614, and the chord 618C of the fourth blade element 618. Similarly, the chord 602C of the stacked rotor blades 602 may be greater than any of the single chords of the plurality of blade elements (e.g., 606C, 610C, 614C, and 618C).

Within examples, the plurality of blade elements may have further relational features. For example, as shown in the top view of FIG. 6A, a tip of the first blade element 606 may be radially aligned (i.e., along an axis parallel to the axis 640) with the leading edge 610A of the second blade element 610. Similarly, a tip of the second blade element 610 may be aligned with the leading edge 614A of the third blade element 614. In such examples, each of the plurality of blade elements may be radially offset from one another relative to the axis 640. More particularly, for example, the first blade element 606 may be radially offset from the second blade element 610. The radial alignment of each of the plurality of blade elements may be at least a feature of a stacked configuration of the blade elements, among other possible features.

A stacked configuration of the stacked rotor blades 602 may be based on the relative dimensions and alignments/arrangements of the blade elements to one another. The stacked alignments and orientations described may allow for the stacked rotor blades 602 to provide the necessary thrust and lift as part of a UAV, while also reducing noise and allowing for quieter flight of the UAV. Moreover, designers and operators may have additional control over the flight and noise compared to another UAV because with the stacked rotor blades 602, the designers and operators may have more customizable options in designing and choosing combinations and orientations of blade elements for a UAV that may function more efficiently or effectively for a desired purpose. For example, various orientations and alignments may allow for easily customizable pitches, cambers, angles of attack, control of rotor surface area, etc., than a single piece rotor.

For example, an operator may determine specific flight characteristics necessary for a certain flight tasks and be able to create or choose a custom rotor specific to those flight tasks. In one example, the flight task may include carrying a heavy payload, and thus a rotor with a high angle of attack that creates a greater amount of lift may be more desirable. With the stacked rotor blades 602, the operator may align a plurality of blade elements with a larger surface area and higher angle of attack in order to provide more lift than a standard UAV rotor. As such, within examples, an angle of attack of the stacked rotor blades 602 may be based on a first angle of attack of the first blade element 606 and a second angle of attack of the second blade element 610. The angle of attack of the stacked rotor blades 602 may further be based on a third angle of attack of the third blade element 614 and a fourth angle of attack of the fourth blade element 618.

In another example, the operator may determine that a more elastic rotor would be preferred. As such, the operator may select a stacked rotor blade, such as one of the stacked rotor blades 602, where, for example, the first blade element 606, the second blade element 610, and the fourth blade element 618 may be constructed from a more elastic material than the third blade element 614. The third blade element 614 may be constructed from a more stiff material to provide support to the stacked rotor blades 602. In short, the stacked rotor blades 602 allow for easy construction of various rotor dimensions, orientations, material properties, etc.

Figure 7:
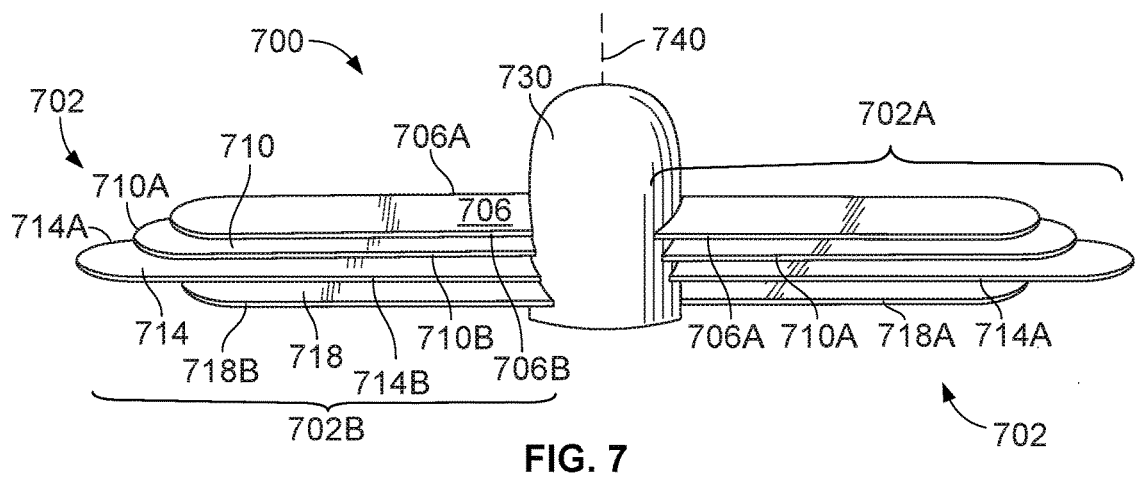
FIG. 7 depicts a stacked blade rotor unit, according to an example embodiment.

Continuing with the Figures, FIG. 7 depicts a stacked blade rotor unit 700, according to an example embodiment. The rotor unit 700 may take the form of, or be similar in form to, the rotor unit 600 of FIGS. 6A and 6B and/or the rotors described in FIGS. 1A-1E above. Moreover, components and aspects of the rotor unit 700 may take similar form and have similar function to components and aspects of the rotor unit 600 of FIGS. 6A and 6B and/or the rotors described in FIGS. 1A-1E.

As shown in FIG. 7, the rotor unit 700 includes two stacked rotor blades 702. The stacked rotor blades 702 may have aspects similar to the stacked rotor blade 400 of FIG. 4 and/or the stacked rotor blade 500 of FIG. 5. The rotor unit 700 further includes a hub 730 that is coupled to the stacked rotor blades 702. The hub 730 may include, or be coupled to, a motor that drives the rotation of the hub 730 and the stacked rotor blades 702 about an axis 740. Each of the stacked rotor blades 702 include a plurality of blade elements, which includes, as depicted in FIG. 7, a first blade element 706, a second blade element 710, a third blade element 714, and a fourth blade element 718. Similar to FIGS. 4A and 4B, each of the plurality of blade elements may have a leading edge (e.g., 706A, 710A, 714A, and 718A) as well as a trailing edge (e.g., 706B, 710B, 714B, and 718B). These leading and trailing edges may be aligned and/or combined to form a leading edge 702A and a trailing edge 702B for the stacked rotor blades 702.

FIG. 7 illustrates a blade element design that may be simpler and/or more cost efficient to implement in some scenarios. Each of the plurality of blade elements (706, 710, 714, and 718) may have the same or similar shape, but at varying lengths. Moreover, each of the plurality of blade elements may be planar in some embodiments or have a very small pitch in other embodiments. The plurality of blade elements may be coupled to the hub 730 at various locations to create desired rotor characteristics for the stacked rotor blades 702. Within examples, a straight edged design, similar to as illustrated in FIG. 7, of the plurality of blade elements (706, 710, 714, and 718) may be relatively simpler and cheaper to produce than other rotor blades, while still maintaining the ability to design and meet required flight characteristics for the stacked rotor blades 702.

Figure 8:
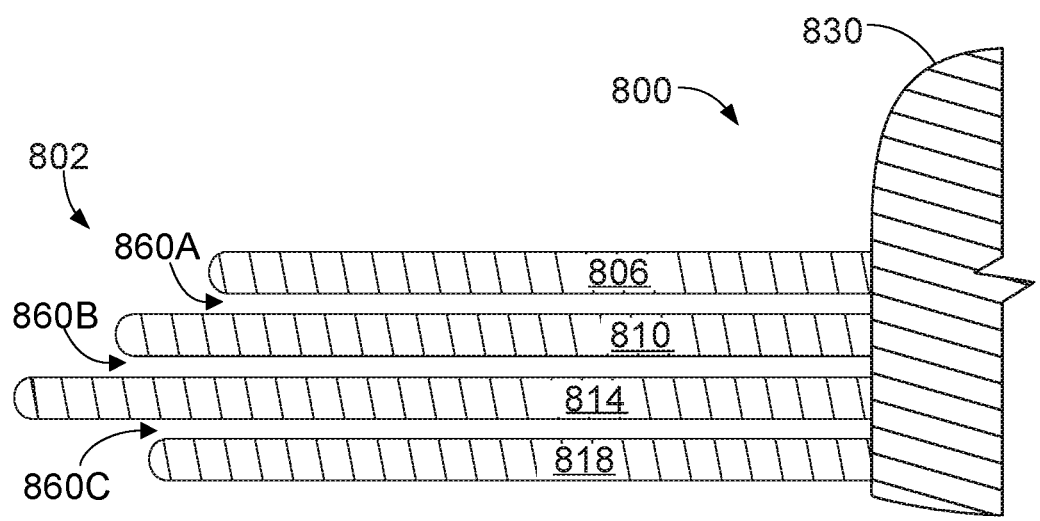
FIG. 8 depicts a cross section of a stacked blade rotor unit, according to an example embodiment.

FIG. 8 depicts a cross section of a stacked blade rotor unit 800, according to an example embodiment. The rotor unit 800 may take the form of, or be similar in form to, the rotor unit 700 of FIG. 7, the rotor unit 600 of FIGS. 6A and 6B, and/or the rotors described in FIGS. 1A-1E above. Moreover, components and aspects of the rotor unit 800 may take similar form and have similar function to components and aspects of the rotor unit 700 of FIG. 7, the rotor unit 600 of FIGS. 6A and 6B, and/or the rotors described in FIGS. 1A-1E.

As shown in FIG. 8, the rotor unit 800 includes a stacked rotor blade 802. The stacked rotor blade 802 may have aspects similar to the stacked rotor blade 400 of FIG. 4 and/or the stacked rotor blade 500 of FIG. 5. The rotor unit 800 further includes a hub 830 that is coupled to the stacked rotor blade 802. The hub 830 may include, or be coupled to, a motor that drives the rotation of the hub 830 and the stacked rotor blade 802. The stacked rotor blade 802 includes a plurality of blade elements, which includes, as depicted in FIG. 8, a first blade element 806, a second blade element 810, a third blade element 814, and a fourth blade element 818.

As depicted in FIG. 8, each of the plurality of blade elements (i.e., 806, 810, 814, and 818) may be separately coupled to the hub 830. The hub 830 may include slots or recess points at which such blade element may be connected to the hub 830. In such examples, the hub 830 may provide for an indexing and the orientation of the plurality of blade elements. As shown, a first gap 860A may exist between the first blade element 806 and the second blade element 810, a second gap 860B may exist between the second blade element 810 and the third blade element 814, and a third gap 860C may exist between the third element 814 and the fourth blade element 818. A magnitude of each of the gaps 860A-C may be based on the indexing and orientation of the plurality of blade elements.

Figure 9:
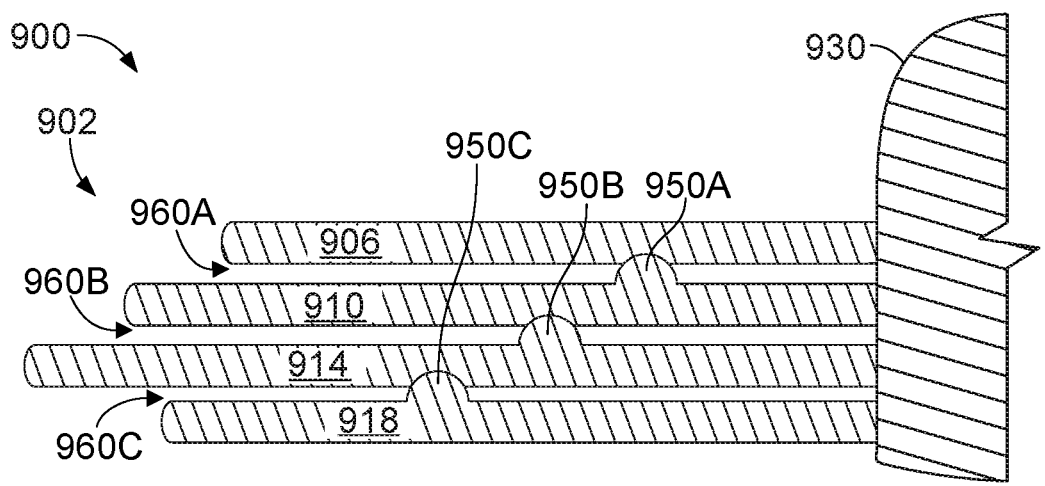
FIG. 9 depicts a cross section of a stacked blade rotor unit, according to an example embodiment.

FIG. 9 depicts a cross section of a stacked blade rotor unit 900, according to an example embodiment. The rotor unit 900 may take the form of, or be similar in form to, the rotor unit 800 of FIG. 8, the rotor unit 700 of FIG. 7, the rotor unit 600 of FIGS. 6A and 6B, and/or the rotors described in FIGS. 1A-1E above. Moreover, components and aspects of the rotor unit 900 may take similar form and have similar function to components and aspects of the rotor unit 800 of FIG. 8, the rotor unit 700 of FIG. 7, the rotor unit 600 of FIGS. 6A and 6B, and/or the rotors described in FIGS. 1A-1E.

As shown in FIG. 9, the rotor unit 900 includes a stacked rotor blade 902. The stacked rotor blade 902 may have aspects similar to the stacked rotor blade 400 of FIG. 4 and/or the stacked rotor blade 500 of FIG. 5. The rotor unit 900 further includes a hub 930 that is coupled to the stacked rotor blade 902. The hub 930 may include, or be coupled to, a motor that drives the rotation of the hub 930 and the stacked rotor blade 902. The stacked rotor blade 902 includes a plurality of blade elements, which includes, as depicted in FIG. 9, a first blade element 906, a second blade element 910, a third blade element 914, and a fourth blade element 918.

FIG. 9 illustrates passive mechanical alignment features that be utilized to align, orientate, and/or index the plurality of blade elements. In some examples, the hub 930 may include an active indexing mechanism, such as a clamping nut, that pushes and holds the plurality of blade elements together such that the alignment features of the plurality of the blade elements are coupled together. The clamping nut of the hub 930 may maintain the overall alignment of the plurality of blade elements. Other mechanical means to maintain the blade elements in a specific position are contemplated herein. Even with an indexing means, a first gap 960A, a second gap 960B, and a third gap 960C may still exist.

Within examples, the first blade element 906 may include a first alignment feature, the second blade element 910 may include a second alignment feature that couples to the first alignment feature, the third blade element 914 may include a third alignment feature that couples to the second alignment feature, and the fourth blade element 918 may include a fourth alignment feature that couples to the third alignment feature.

As depicted in FIG. 9, the second blade element 910 may include a first protrusion 950A, the third blade element 914 may include a second protrusion 950B, and the fourth blade element 918 may include a third protrusion 950C. Each of the protrusion features 950A-C may be positioned on a top surface of the respective blade elements. In some examples, the protrusions 950A-C may be dome-shaped. The first blade element 906 may have a first recessed alignment feature shaped similar to the first protrusion 950A (e.g., a recessed dome shape) such that the protrusion 950A fits at least partially within the recessed feature. In some examples, the protrusion 950A is configured to mate with the recess or recess feature of the first blade element 906. As such, the first protrusion 950A may correspond to the recessed alignment feature and may maintain a relative positioning or alignment of the first blade element 906 to the second blade element 910. In some aspects, the first protrusion 950A of the second blade element 910 may couple to the recessed alignment feature of the first blade element 906.

Similarly, the second blade element 910 may have a second recessed alignment feature shaped similar to the second protrusion feature 950B such that the alignment features correspond to one another and may maintain a relative positioning of (or limit an amount of movement between) the second blade element 910 to the third blade element 914. In some aspects, the second protrusion 950B of the third blade element 914 may couple to the recessed alignment feature of the second blade element 910. Additionally, in some examples, the third blade element 914 may have a third recessed alignment feature shaped similar to the third protrusion 950C such that the alignment features correspond to one another and may maintain a relative positioning of the third blade element 914 to the fourth blade element 918. In some aspects, the third protrusion 950C of the fourth blade element 918 may couple to the recessed alignment feature of the third blade element 914.

Figure 10:
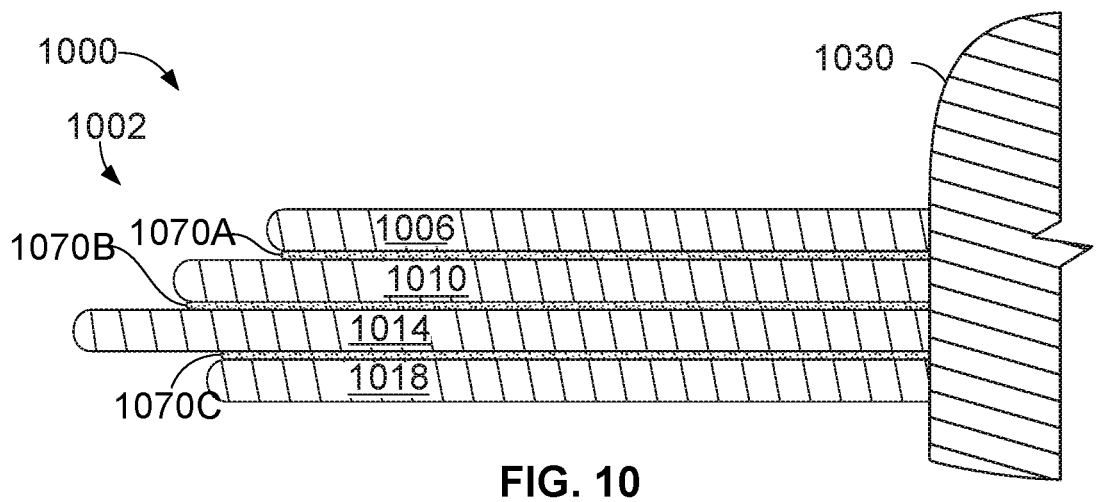
FIG. 10 depicts a cross section of a stacked blade rotor unit, according to an example embodiment.

FIG. 10 depicts a cross section of a stacked blade rotor unit 1000, according to an example embodiment. The rotor unit 1000 may take the form of, or be similar in form to, the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E above. Moreover, components and aspects of the rotor unit 1000 may take similar form and have similar function to components and aspects of the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E.

As shown in FIG. 10, the rotor unit 1000 includes a stacked rotor blade 1002. The stacked rotor blade 1002 may have aspects similar to the stacked rotor blade 400 of FIG. 4 and/or the stacked rotor blade 500 of FIG. 5. The rotor unit 1000 further includes a hub 1030 that is coupled to the stacked rotor blade 1002. The hub 1030 may include, or be coupled to, a motor that drives the rotation of the hub 1030 and the stacked rotor blade 1002. The stacked rotor blade 1002 includes a plurality of blade elements, which includes, as depicted in FIG. 10, a first blade element 1006, a second blade element 1010, a third blade element 1014, and a fourth blade element 1018.

Unlike the rotor units 800 and 900 of FIGS. 8 and 9 respectively, there are no gaps between the plurality of blade elements of FIG. 10. Within examples, the plurality of blade elements may be bonded and/or coupled together using a bonding agent such as a glue or an adhesive layer between the blade elements. For example, the first blade element 1006 may be coupled to the second blade element 1010 in a stacked configuration or specific alignment to one another by a bonding agent 1070A. Similarly, the second blade element 1010 may be coupled to the third blade element 1014 by a bonding agent 1070B, and the third blade element 1014 may be coupled to the fourth blade element 1018 by a bonding agent 1070C. In some examples, the bonding agents 1070A-1070C may be interface sheets constructed from piezo sheets that may be coupled between surfaces of the blade elements. In some embodiments, the plurality of blade elements may be aligned and bonded together before being coupled to the hub 1030.

Figure 11:
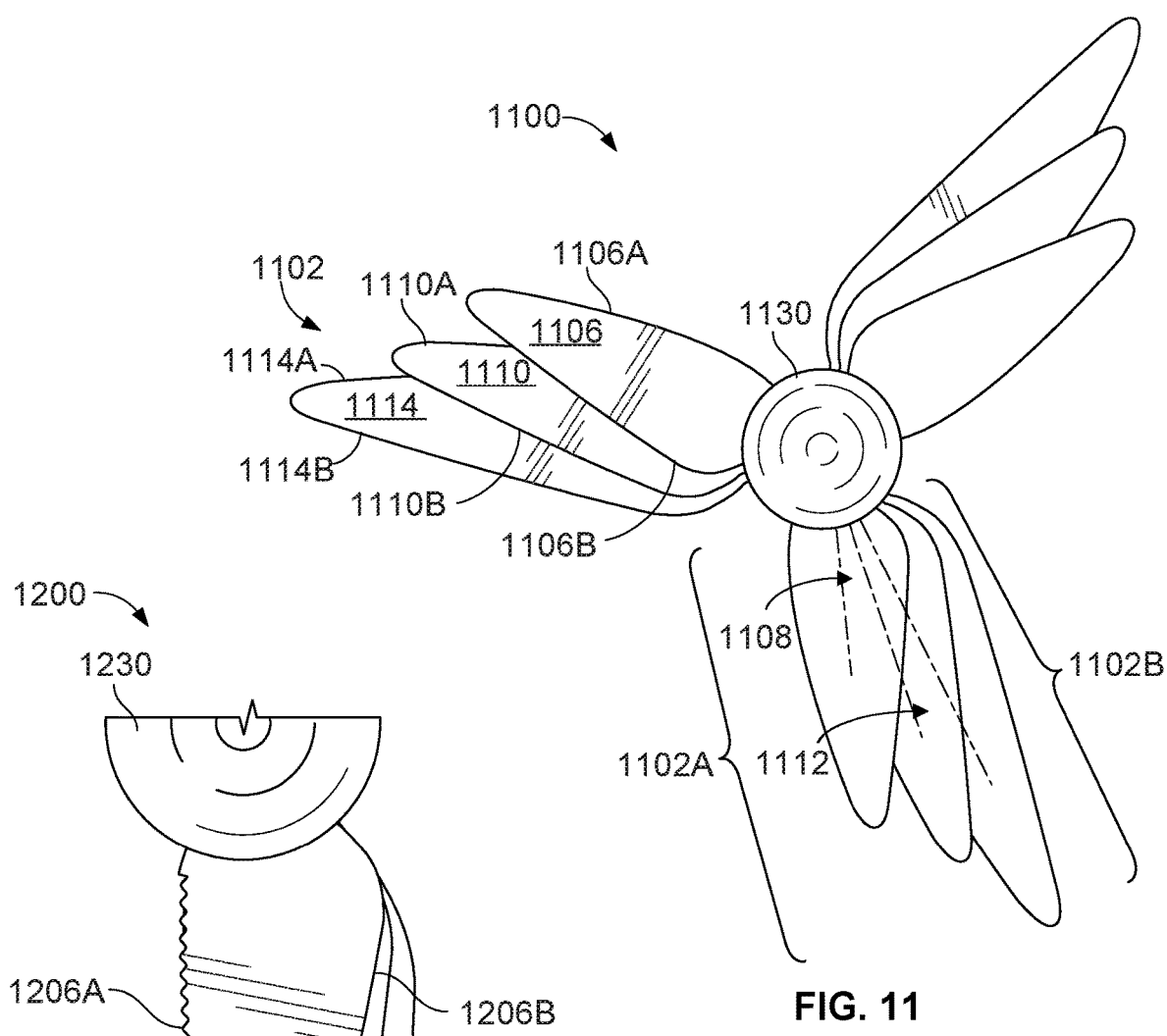
FIG. 11 depicts a top view of a stacked blade rotor unit, according to an example embodiment.

FIG. 11 depicts yet another stacked blade rotor unit 1100, according to an example embodiment. The rotor unit 1100 may take the form of, or be similar in form to, the rotor unit 1000 of FIG. 10, the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E above. Moreover, components and aspects of the rotor unit 1100 may take similar form and have similar function to components and aspects of the rotor unit 1000 of FIG. 10, the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E.

As shown in FIG. 11, the rotor unit 1100 includes three stacked rotor blades 1102. The stacked rotor blades 1102 may have aspects similar to the stacked rotor blade 400 of FIG. 4 and/or the stacked rotor blade 500 of FIG. 5. While three stacked rotor blades 1102 are depicted, more than three stacked rotor blades are also contemplated herein. The rotor unit 1100 further includes a hub 1130 that is coupled to the stacked rotor blades 1102. The hub 1130 may include, or be coupled to, a motor that drives the rotation of the hub 1130 and the stacked rotor blades 1102 about an axis. Each of the stacked rotor blades 1102 include a plurality of blade elements, which includes, as depicted in FIG. 11, a first blade element 1106, a second blade element 1110, and a third blade element 1114. Although each of the stacked rotor blades 1102 are depicted as having the plurality of blade elements that includes three blades (i.e., 1106, 1110, and 1114), more and less blades as part of each plurality of blade elements for the stacked rotor blades 1102 are contemplated herein.

Each of the plurality of blade elements includes a leading edge (e.g. 1106A, 1110A, and 1114A) as well as a trailing edge (e.g., 1106B, 1110B, and 1114B). Moreover, the leading edges 1106A, 1110A, and 1114A form a leading edge 1102A of the stacked rotor blades 1102 and also the trailing edges 1106B, 1110B, and 1114B form a trailing edge 1102B of the stacked rotor blades 1102. Although 1102A has been designated the leading edge and 1102B the trailing edge, in other examples the trailing edge and leading edge may be reversed. That is, the reverse orientation is also contemplated herein.

FIG. 11 also illustrates an example where the first blade element 1106 may be radially offset from the second blade element 1110 by angle 1108. Similarly, the second blade element 1110 may be radially offset from the third blade element 1114 by angle 1112. An amount of offset, i.e., a magnitude of the angle 1108 and the angle 1112 may allow for control over features of the stacked rotor blades 1102, such as an angle of attack, the camber, and a surface area of the stacked rotor blades 1102, among others. In some examples, the angle 1108 may be equal to the angle 1112, while in other examples the angle 1108 may be different than the angle 1112.

Figure 12:
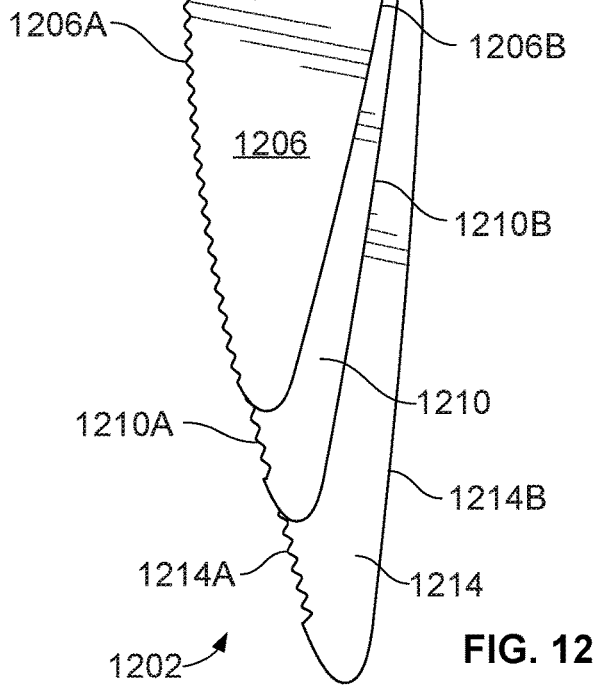
FIG. 12 depicts a partial top view of a stacked blade rotor unit, according to an example embodiment.

FIG. 12 depicts a partial view of rotor unit 1200, according to an example embodiment. The rotor unit 1200 may take the form of, or be similar in form to, the rotor unit 1100 of FIG. 11, the rotor unit 1000 of FIG. 10, the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E above. Moreover, components and aspects of the rotor unit 1200 may take similar form and have similar function to components and aspects of the rotor unit 1100 of FIG. 11, the rotor unit 1000 of FIG. 10, the rotor unit 900 of FIG. 9, the rotor unit 800 of FIG. 8, the rotor unit 700 of FIG. 7, the rotor unit 600 of FIGS. 6A and 6B, and/or the rotors described in FIGS. 1A-1E.

As shown in FIG. 12, the rotor unit 1200 includes a stacked rotor blade 1202. The stacked rotor blade 1102 may have aspects similar to the stacked rotor blade 400 of FIG. 4 and/or the stacked rotor blade 500 of FIG. 5. The rotor unit 1200 further includes a hub 1230 that is coupled to the stacked rotor blades 1202. The hub 1230 may include, or be coupled to, a motor that drives the rotation of the hub 1230 and the stacked rotor blades 1202. The stacked rotor blade 1202 include a plurality of blade elements, which includes, as depicted in FIG. 12, a first blade element 1206, a second blade element 1210, and a third blade element 1214.

As depicted in FIG. 12, the plurality of blade elements may include other physical features to increase aerodynamic efficiency and control. For example, a leading edge 1206A of the first blade element 1206, a leading edge 1210A of the second blade element 1210, and a leading edge 1214A of the third blade element 1214, may be tubercle. As such, a leading edge of the stacked rotor blade 1202 may also be tubercle. In other examples, leading edges may be serrated, undulating, or a variety of other shapes.

Moreover, FIG. 12 also provides another example alignment where a tip of the first blade element 1206 overlaps a top surface of the second blade element 1210. Within examples, the leading edges of the plurality of blade elements (i.e., 1206A, 1210A, and 1214A) are radially aligned with one another. However, a trailing edge 1206B of the first blade element 1206, a trailing edge 1210B of the second blade element 1210, and a trailing edge 1214B of the third blade element 1214 may be offset from one another such that the stacked rotor blade 1202 has a stepped-down orientation. Within examples, as depicted in FIG. 12, the stacked rotor blade 1202 may have a small lower camber and a large upper camber, based on the alignments shown. Other alignments and combinations of blade element orientations are possible to create other stacked rotor blade shapes.

Figure 13:
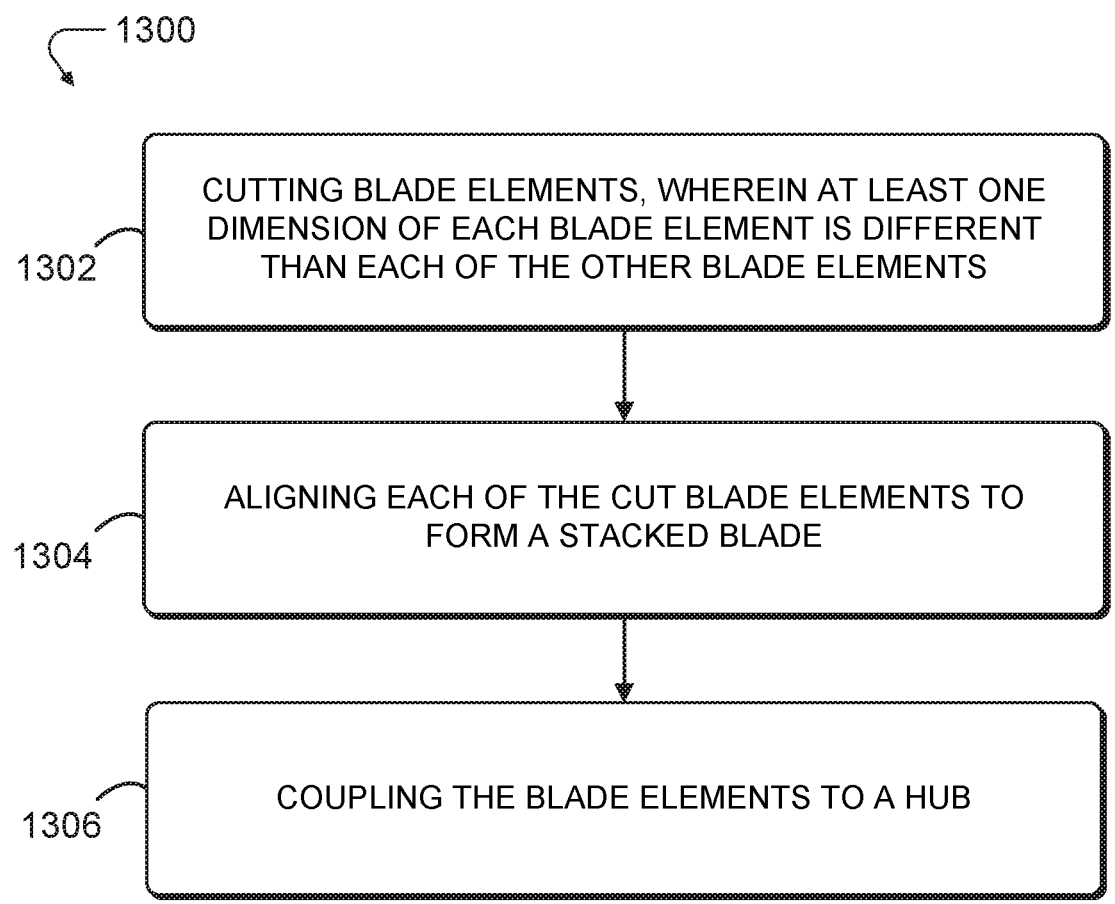
FIG. 13 is a block diagram of an example method, according to an example embodiment.

Additionally, a method for manufacturing a stacked blade rotor unit is disclosed. FIG. 13 is a simplified block diagram illustrating a method 1300 for manufacturing a stacked blade rotor unit, according to an example embodiment. It should be understood that example methods, such as method 1300, might be carried out by entities, or combinations of entities (i.e., by other computing devices, and/or combinations thereof), without departing from the scope of the invention.

For example, functions of the method 1300 may be fully performed by a machine, a human operator, a computing device (or components of a computing device such as one or more processors or controllers), or may be distributed across multiple components of the computing device, across multiple computing devices, and/or across a server. In some examples, the computing device may receive information from input commands initiated by an operator, sensors of the computing device, or may receive information from other computing devices that collect the information.

As shown by block 1302, the method 1300 includes cutting a plurality of blade elements. Within examples, at least one dimension of each of the plurality of blade elements may be different than a corresponding dimension of each other blade element of the plurality of blade elements. For example, a span of a first blade element may be different than a span of a second blade element, etc. The blade elements may be laser cut or otherwise mechanically cut from fiber sheets, metal, plastic, and a variety of other materials. In some examples, the blade elements or interface elements may be constructed from piezo sheets for more acoustic control of the stacked rotor blade.

As shown by 1304, the method 1300 includes aligning the cut blade elements to form a stacked rotor blade. Design features of the stacked rotor blade, such as a leading edge of the stacked rotor blade, a profile of the stacked rotor blade, a chord of the stacked rotor blade, and a span of the stacked rotor blade, among other features, may be based on the corresponding features of the individual blade elements as well as the alignment and orientation of those blade elements relative to one another.

As shown by block 1306, the method 1300 further includes coupling the plurality of blade elements to a hub. In some examples, the blade elements may be fixed to each other before being coupled to the hub. In other examples, each blade element may be coupled to the hub one at a time. Within examples, the plurality of blade elements may be coupled to the hub such that the blade elements are radially offset from one another in order to create a preferred or desired shape of the stacked rotor blade.

IV. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

I claim:

1. A rotor unit comprising:
   a hub that is configured to rotate about an axis in a first rotational direction; and
   a stacked rotor blade fixed to the hub such that the stacked rotor blade is rotatable about the axis, the stacked rotor blade comprising:
      a first blade element comprising a first leading edge and a first alignment feature, and
      a second blade element comprising a second leading edge and a second alignment feature,
      wherein the first blade element and the second blade element are arranged in a stacked configuration,
      wherein the first alignment feature of the first blade element couples to the second alignment feature of the second blade element, and
      wherein at least a portion of the first leading edge and at least a portion of the second leading edge form a leading edge of the stacked rotor blade.

2. The rotor unit of claim 1, wherein at a first radial distance from the axis, a chord of the stacked rotor blade is greater than each of a chord of the first blade element and a chord of the second blade element.

3. The rotor unit of claim 1, wherein a span of the stacked rotor blade is greater than a span of the first blade element, and further wherein the span of the stacked rotor blade is greater than a span of the second blade element.

4. The rotor unit of claim 1, wherein the first blade element is radially offset from the second blade element relative to the axis.

5. The rotor unit of claim 1, wherein a tip of the first blade element is radially aligned with the leading edge of the second blade element.

6. The rotor unit of claim 1, wherein the stacked rotor blade further comprises a third blade element and a span of the third blade element is greater than a span of the second blade element, and a length of the second blade element is greater than a span of the first blade element.

7. The rotor unit of claim 1, wherein the first alignment feature is formed within the first blade element, and further wherein the second alignment feature is formed within the second blade element.

8. The rotor unit of claim 1, wherein the first alignment feature comprises a recess, and wherein the second alignment feature comprises a protrusion configured to mate with the recess.

9. The rotor unit of claim 1, wherein the hub comprises a clamping nut that maintains an alignment between the first blade element and the second blade element.

10. The rotor unit of claim 1, wherein the first blade element is constructed from a first material, wherein the second blade element is constructed from a second material, and wherein the first material has a different elasticity than the second material.

11. The rotor unit of claim 1, wherein at least a portion of the leading edge of the first blade element comprises tubercles.

12. The rotor unit of claim 1, wherein an angle of attack of the stacked rotor blade is based on a combination of a first angle of attack of the first blade element and a second angle of attack of the second blade element.

13. The rotor unit of claim 1, wherein the first blade element is planar.

14. The rotor unit of claim 1, wherein the stacked configuration is arranged such that the first blade element is stacked directly on the second blade element.

15. The rotor unit of claim 1, wherein the first alignment feature and the second alignment feature are coupled such that the first blade element is fixed relative to the second blade element.

16. A stacked rotor blade comprising:
a first planar blade element comprising a first leading edge and a bottom planar surface, and
a second planar blade element comprising a second leading edge and a top planar surface;
wherein the bottom planar surface of the first planar blade element is directly fixed to the top planar surface of the second planar blade element in a stacked configuration,
wherein the stacked rotor blade is configured to rotate in a first rotation direction,
wherein at least a portion of the first leading edge leads the second leading edge in the first rotation direction, and
wherein at least a portion of the first leading edge and at least a portion of the second leading edge form a leading edge of the stacked rotor blade.

17. A method comprising:
cutting a plurality of blade elements, wherein at least one dimension of each of the plurality of blade elements is different than a corresponding dimension of each other blade element of the plurality of blade elements;
aligning and directly fixing each of the plurality of cut blade elements to form a stacked blade, wherein the alignment of the plurality of cut blade elements further defines a profile of the stacked blade, and wherein a leading edge of the stacked blade comprises at least a portion of a leading edge from each of the plurality of cut blade elements; and
coupling the stacked blade to a hub.

18. The method of claim 17, wherein aligning each of the plurality of cut blades comprises:
coupling each of the plurality of cut blade elements to another of the plurality of cut blade elements such that each of the plurality of cut blade elements is radially offset relative an axis of rotation from another of the plurality of cut blade elements, wherein the axis of rotation extends vertically through a center of the hub.

19. The method of claim 17, wherein the plurality of blade elements are each cut from a fiber sheet.

20. The stacked rotor blade of claim 16, wherein the bottom planar surface of the first planar blade is adhered to the top planar surface of the second planar blade element in a stacked configuration.

\* \* \* \* \*